United States Patent
Stocksiefen

(10) Patent No.: US 6,544,026 B1
(45) Date of Patent: Apr. 8, 2003

(54) DUAL-SPEED MOLD-CLOSING SYSTEM

(75) Inventor: Raimund Stocksiefen, Troisdorf (DE)

(73) Assignee: Sig Kautex GmbH & Co. KG, Bonn (DE)

( * ) Notice: Subject to any disclaimer, the term of this patent is extended or adjusted under 35 U.S.C. 154(b) by 319 days.

(21) Appl. No.: 09/613,155

(22) Filed: Jul. 10, 2000

(30) Foreign Application Priority Data

Jul. 14, 1999 (DE) .......................................... 199 32 741

(51) Int. Cl.[7] .............................................. B29C 49/56
(52) U.S. Cl. ..................... 425/214; 264/523; 425/451.7; 425/541
(58) Field of Search .................... 264/523; 425/214, 425/541, 451.2, 451.7, 451.9

(56) References Cited

U.S. PATENT DOCUMENTS

| 5,378,140 A | * | 1/1995 | Asano et al. ............. 425/451.2 |
| 5,720,918 A | | 2/1998 | Wollschlager ............. 264/540 |
| 5,730,927 A | * | 3/1998 | Rader et al. ................. 425/541 |
| 5,975,881 A | * | 11/1999 | Langos et al. .............. 425/541 |
| 6,254,371 B1 | * | 7/2001 | McNally et al. ............ 425/214 |

* cited by examiner

Primary Examiner—James P. Mackey
(74) Attorney, Agent, or Firm—Herbert Dubno; Andrew Wilford

(57) ABSTRACT

A mold system has a pair of mold halves movable toward and away from each other, a threaded spindle coupled to one of the mold halves, and a nut threaded on the spindle and coupled to the other of the mold halves. A high-speed low-torque brakable spindle motor is connected to the spindle and operable to rotate the spindle in the nut and a low-speed high-torque nut motor separate from the spindle motor is connected to the nut and operable to rotate the nut on the spindle. In a first mold-closing stage the spindle motor is operated to rotate the spindle in the nut and move the mold-halves rapidly toward each other. Thereafter in a second and subsequent mold-clamping stage the spindle motor is braked and the nut motor is operated to rotate the nut on the spindle and press the mold halves against each other.

9 Claims, 1 Drawing Sheet

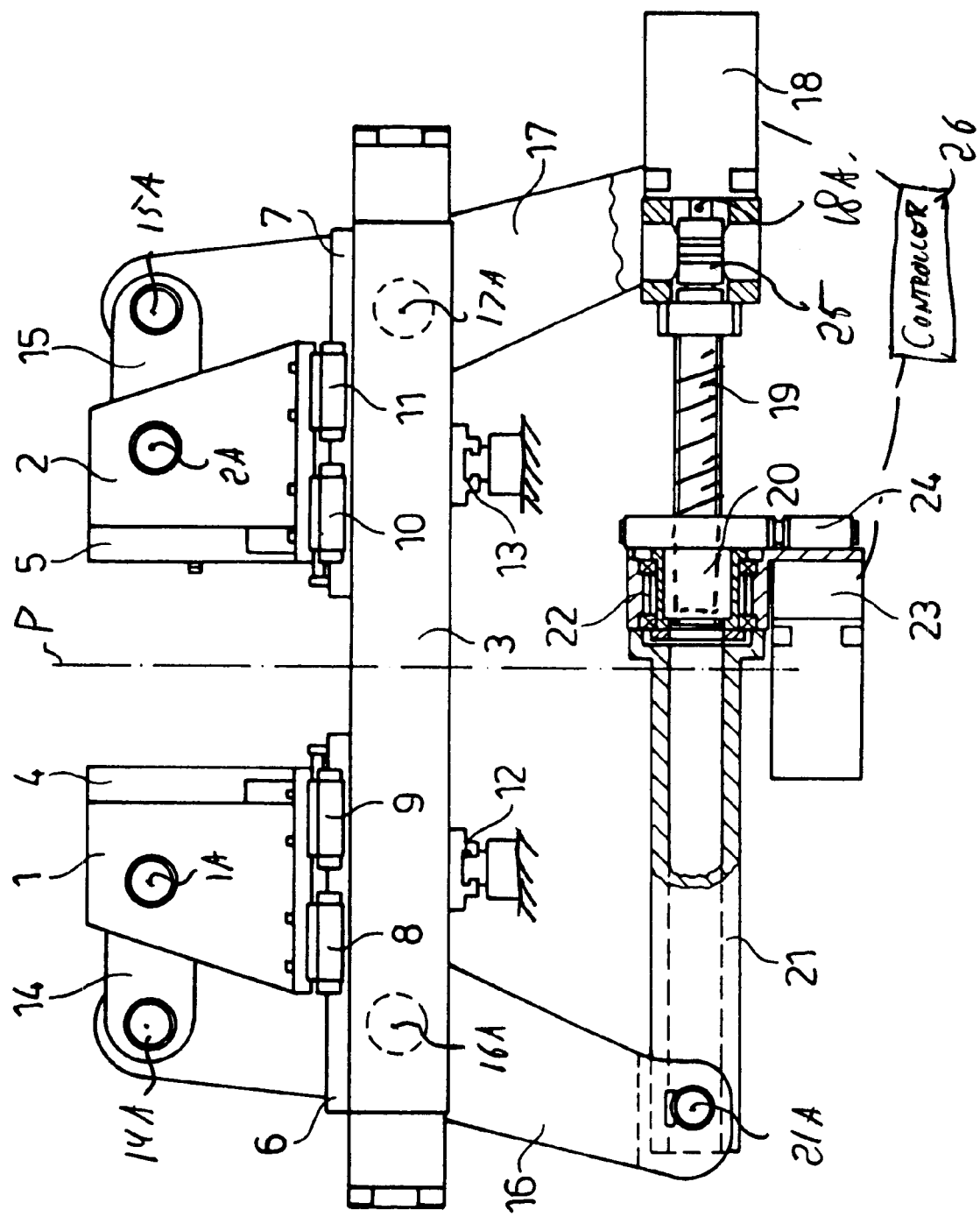

DUAL-SPEED MOLD-CLOSING SYSTEM

FIELD OF THE INVENTION

The present invention relates to a molding system. More particularly this invention concerns a dual-speed method and apparatus for closing a blow mold.

BACKGROUND OF THE INVENTION

It is standard as described in U.S. Pat. No. 5,720,918 to close a two-part mold by first moving the mold halves together at a relatively high speed until they touch, then pressing them together with much greater force during the subsequent filling, blowing, and curing steps of a blow-molding operation. The mold halves are carried on respective support plates that can slide along a base. A double-acting light-duty hydraulic cylinder extends between the support plates, typically below the base, and serves for the fast mold-closing operation. Further heavier-duty cylinders mounted right on the mold plates are employed to apply the much greater force needed to clamp the mold halves together during the filling of the mold and curing of the molded article.

Such an arrangement is fairly complex. There are two separate actuators that must be controlled independently and in general the system is quite complicated.

OBJECTS OF THE INVENTION

It is therefore an object of the present invention to provide an improved mold-closing system.

Another object is the provision of such an improved mold-closing system which overcomes the above-given disadvantages, that is which is fairly simple in construction and operation.

SUMMARY OF THE INVENTION

A mold system has a pair of mold halves movable toward and away from each other, a threaded spindle coupled to one of the mold halves, and a nut threaded on the spindle and coupled to the other of the mold halves. A brakable spindle motor is connected to the spindle and operable to rotate the spindle in the nut and a nut motor separate from the spindle motor is connected to the nut and operable to rotate the nut on the spindle. In a first mold-closing stage the spindle motor is operated to rotate the spindle in the nut and move the mold-halves rapidly toward each other. Thereafter in a second and subsequent mold-clamping stage the spindle motor is braked and the nut motor is operated to rotate the nut on the spindle and press the mold halves against each other.

Such a system is quite simple. It uses a straightforward spindle/nut assembly for both the high-speed low-force closing operation and the low-speed high-force clamping operation. According to the invention the spindle motor is a high-speed low-torque motor and the nut motor is a low-speed high-torque motor, either electric or hydraulic. The use of two separate motors each built for its specific task means that two relatively small devices can be used.

According to the invention in the mold-closing stage of the nut motor is braked. Thus all of the movement in this stage is the responsibility of the spindle motor. Normally according to the invention braking of the nut motor is stopped shortly before the spindle motor is braked, whereupon the nut motor takes over to continue the movement but at a lower speed and greater torque. It is also possible in accordance with the invention to operate the nut motor in the mold-closing stage to rotate the nut on the spindle while the spindle motor is operating, thereby using both motors for the closing stage.

During filling of a cavity of the mold halves both of the motors are shut down and braked to lock the mold shut, allowing them to cool. Furthermore according to the invention the nut and spindle are interconnected by recirculating balls. The system has according to the invention a base on which the mold halves are displaceable horizontally and a pair of first-class levers pivoted on the base and each having one end connected to a respective one of the mold halves and another end. One of the other ends is connected to the nut and the other of the other ends is connected to the spindle. The spindle motor is carried on the one of the other ends and the nut motor is carried on the other of the other ends.

BRIEF DESCRIPTION OF THE DRAWING

The above and other objects, features, and advantages will become more readily apparent from the following description, reference being made to the accompanying drawing whose sole FIGURE is a partly diagrammatic side view of the system of this invention.

SPECIFIC DESCRIPTION

As seen in the drawing two mold support plates 1 and 2 are horizontally displaceable relative to a base 3 and carry respective mold halves 4 and 5. Guides 6 and 7 on the base 3, which is supported at 12 and 13, engage slides 8 and 9 on the plate 1 and slides 10 and 11 on the support plate 2.

A pair of horizontal short links 14 and 1have inner ends pivoted at 1A and 2A on the mold-support plates 1 and 2 and outer ends pivoted at 14A and 15A on large vertical levers 16 and 17 pivoted at 16A and 17A on the base 3. The axes 1A, 2A, 14A, 15A, 16A, and 17A are all horizontal and parallel to one another. The levers 16 and 17 can be pivoted as first-class levers about their axes 16A and 17A to move the mold halves 4 and 5 toward a center plane P where the cavity they form can be filled by an unillustrated extruder head.

According to the invention a high-speed low-torque motor 18 pivoted at 18A on the lower end of the lever 17 is connected via a coupling 25 with a threaded spindle 19 engaged in a nut 20 carried via a bearing 22 on an inner end of a tubular support link 21 pivoted at its outer end at 21A on the lower end of the lever 16. The axes 18A and 21A are horizontal and parallel to each other and to the other above-discussed axes. The nut 22 can be rotated via a toothed-belt drive 24 by a low-speed high-torque motor 23 carried on the inner end of the link 21. A controller 26 operates the two motors 18 and 23 which have motor brakes. The spindle 19 is dimensioned to be strong enough to withstand the considerable compressive forces needed at the lower ends of the levers to achieve the desired clamping force between the two mold halves 4 and 5, although admittedly during the closing stage this spindle 19 is not subject to significant axial compression.

According to the invention the mold 4, 5 is closed by first actuating only the high-speed motor 18 while braking the motor 23 so that the spindle 19 rotates in the nut 20 to force the lower ends of the levers 16 and 17 apart while moving together their upper ends, and with them the mold halves 4 and 5. Once the mold halves 4 and 5 touch the motor 18 is braked and the motor 23 is started to rotate the nut 20 on the stationary spindle 19, thereby forcing the mold halves 4 and 5 together with considerable force.

In order to open the mold 4, 5 it is normally only necessary to use the motor 18, as the mold halves 4 and 5 typically spring apart in a blow-molding system after the workpiece is cured. If the mold halves 4 and 5 stick together, the greater torque of the motor 23 used for the clamping stage is employed to separate them.

To speed the mold-closing operation it is within the scope of the invention to use both the motors 18 and 23 simultaneously.

I claim:

1. A method of operating a mold system having:
   a pair of mold halves movable toward and away from each other;
   a threaded spindle coupled to one of the mold halves;
   a nut threaded on the spindle and coupled to the other of the mold halves;
   a brakable spindle motor connected to the spindle and operable to rotate the spindle in the nut;
   a nut motor separate from the spindle motor, connected to the nut, and operable to rotate the nut on the spindle, the method comprising the steps of:
      in a first mold-closing stage operating the spindle motor to rotate the spindle in the nut and move the mold-halves toward each other, and
      thereafter in a second and subsequent mold-clamping stage braking the spindle motor and operating the nut motor to rotate the nut on the spindle and press the mold halves against each other.

2. The mold-operating method defined in claim 1 further comprising the step in the mold-closing stage of braking the nut motor.

3. The mold-operating method defined in claim 2 wherein braking of the nut motor is stopped shortly before the spindle motor is braked.

4. The mold-operating method defined in claim 1 further comprising the step in the mold-closing stage of operating the nut motor to rotate the nut on the spindle.

5. The mold-operating method defined in claim 1, further comprising the step after the second mold-clamping stage of braking both of the motors during filling of a cavity of the mold halves.

6. In combination with a mold having a pair of mold halves movable toward and away from each other, a mold-closing system comprising:
   a threaded spindle coupled to one of the mold halves;
   a nut threaded on the spindle and coupled to the other of the mold halves;
   a brakable spindle motor connected to the spindle and operable to rotate the spindle in the nut;
   a nut motor separate from the spindle motor, connected to the nut, and operable to rotate the nut on the spindle; and control means for
      in a mold-closing stage operating the spindle motor to rotate the spindle in the nut and move the mold-halves toward each other, and
      in a mold-clamping stage braking the spindle motor and operating the nut motor to rotate the nut on the spindle and press the mold halves against each other.

7. The mold-closing system defined in claim 6 wherein the nut and spindle are interconnected by recirculating balls.

8. The mold-closing system defined in claim 6, further comprising:
   a base on which the mold halves are displaceable horizontally; and
   a pair of levers pivoted on the base and each having one end connected to a respective one of the mold halves and another end, one of the other ends being connected to the nut and the other of the other ends being connected to the spindle.

9. The mold-closing system defined in claim 8 wherein the spindle motor is carried on the one of the other ends and the nut motor is carried on the other of the other ends.

* * * * *